US012701100B2

(12) United States Patent
Zhou et al.

(10) Patent No.: US 12,701,100 B2
(45) Date of Patent: Aug. 4, 2026

(54) METHOD AND APPARATUS FOR ACCESSING A VIRTUAL IP ADDRESS ACROSS CLUSTERS, ELECTRONIC DEVICE, AND STORAGE MEDIUM

(71) Applicant: SUZHOU METABRAIN INTELLIGENT TECHNOLOGY CO., LTD., Suzhou (CN)

(72) Inventors: Heng Zhou, Suzhou (CN); Haizhong Qin, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/163,614

(22) PCT Filed: Nov. 21, 2023

(86) PCT No.: PCT/CN2023/132989
§ 371 (c)(1),
(2) Date: Sep. 9, 2025

(87) PCT Pub. No.: WO2024/193076
PCT Pub. Date: Sep. 26, 2024

(65) Prior Publication Data
US 2026/0122030 A1     Apr. 30, 2026

(30) Foreign Application Priority Data
Mar. 20, 2023    (CN) .......................... 202310271383.5

(51) Int. Cl.
*H04L 61/5007*    (2022.01)
*H04L 45/745*    (2022.01)

(52) U.S. Cl.
CPC ........ *H04L 61/5007* (2022.05); *H04L 45/745* (2013.01)

(58) Field of Classification Search
CPC .......................... H04L 61/5007; H04L 45/745
See application file for complete search history.

(56) References Cited

U.S. PATENT DOCUMENTS

| | | | |
|---|---|---|---|
| 10,382,329 B1 * | 8/2019 | Thomas | ................ H04L 61/103 |
| 2014/0204761 A1 * | 7/2014 | Durrani | ................ H04L 47/125 370/236 |

(Continued)

FOREIGN PATENT DOCUMENTS

| | | |
|---|---|---|
| CN | 104253751 A | 12/2014 |
| CN | 105453492 A | 3/2016 |

(Continued)

*Primary Examiner* — Minh Chau Nguyen
(74) *Attorney, Agent, or Firm* — IPro, PLLC

(57) ABSTRACT

A method for accessing a virtual IP address across clusters is provided. The method is applied to a gateway node of a first cluster, where the first cluster is connected to a second cluster through a router, and the method includes: matching a received packet with a flow table, where the packet carries a virtual IP address and a MAC address corresponding to the virtual IP address; and in response to the packet being successfully matched with a first flow entry in the flow table, determining that the virtual IP address drifts into a virtual machine in the first cluster, and adding static routing corresponding to the virtual IP address to a router of the second cluster according to the virtual IP address and the MAC address corresponding to the virtual IP address to enable the second cluster to access the virtual IP address in the first cluster.

20 Claims, 4 Drawing Sheets

(56)     References Cited

U.S. PATENT DOCUMENTS

2015/0043576  A1      2/2015   Dixon et al.
2021/0021522  A1*     1/2021   Labonté ................. H04L 47/15
2021/0382912  A1     12/2021   Horowitz et al.

FOREIGN PATENT DOCUMENTS

CN          107040469  A       8/2017
CN          107508795  A      12/2017
CN          110392125  A      10/2019
CN          111736955  A      10/2020
CN          114866467  A       8/2022
CN          115277349  A      11/2022
CN          115987890  A       4/2023
WO         2022083464  A1      4/2022

* cited by examiner

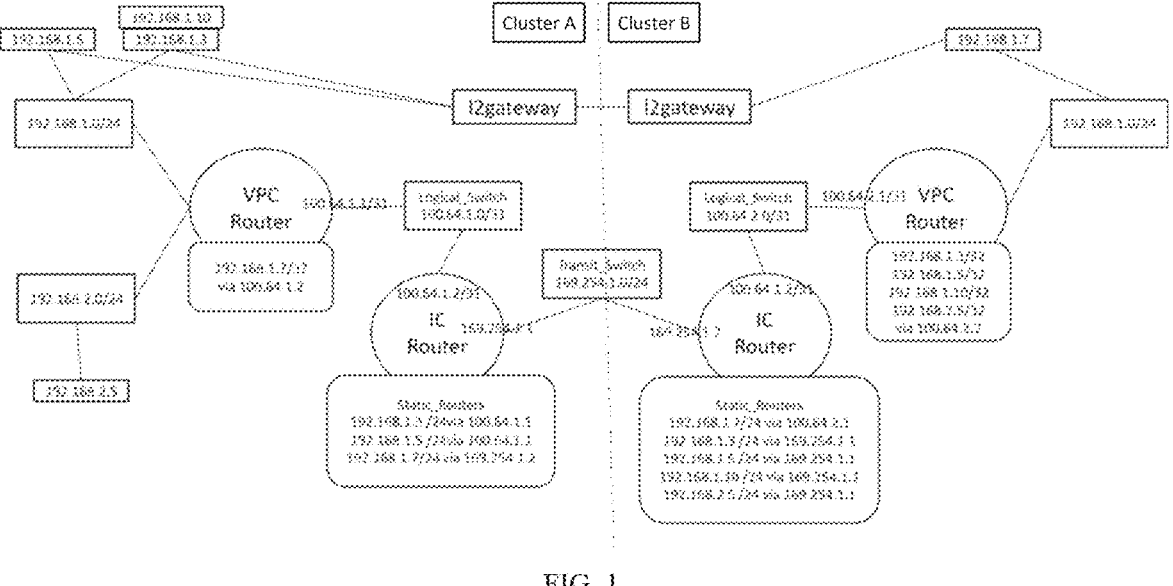

FIG. 1

| | |
|---|---|
| Received packet is matched with a flow table | 201 |
| In response to the packet being successfully matched with a first flow entry in the flow table, it is determined that the virtual IP address drifts into a virtual machine in the first cluster, and static routing corresponding to the virtual IP address is added to a router of the second cluster according to the virtual IP address and the MAC address corresponding to the virtual IP address to enable the second cluster to access the virtual IP address in the first cluster | 202 |

FIG. 2

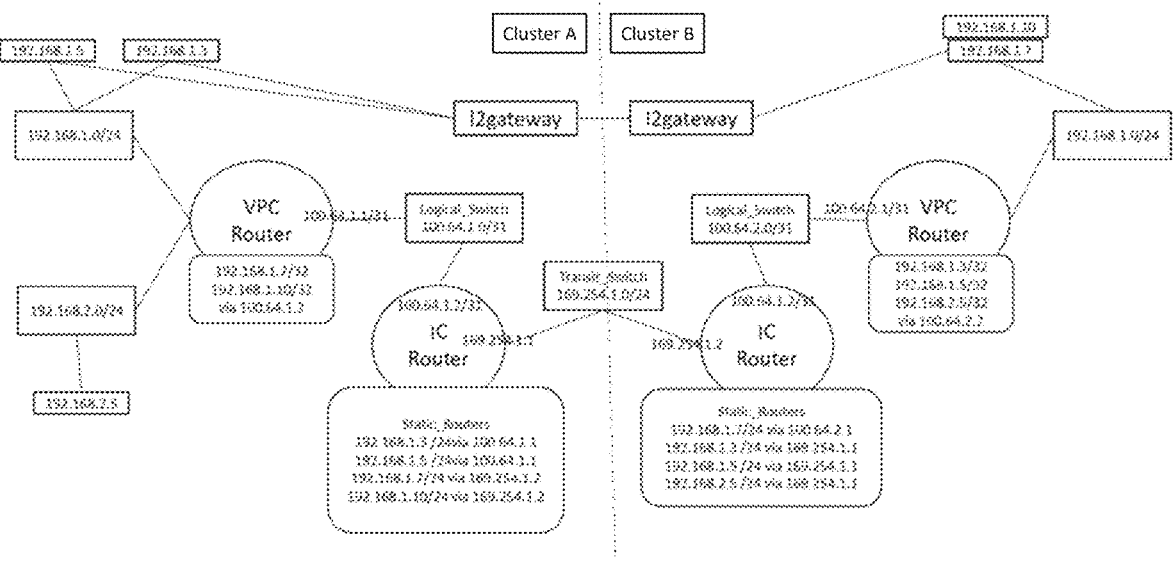

FIG. 3 openvswitch

| Match packets with priority C | Match packets with priority D |
|---|---|

L2gateway Control Agent

Determine matched data direction

From within this cluster     From other clusters

| Add packets with priorities B and D | Delete packets with priorities B and D |
|---|---|
| Add mac_binding | Delete mac_binding | neutron-server

Monitor changes of mac_binding

Add mac_binding     Delete mac_binding

| Add local IP and inform other clusters to add static routing | Delete local IP and inform other clusters to add static routing |
|---|---|
| Update mac_binding related to routing interface | Delete mac_binding related to routing interface |

Computer Program

METHOD AND APPARATUS FOR ACCESSING A VIRTUAL IP ADDRESS ACROSS CLUSTERS, ELECTRONIC DEVICE, AND STORAGE MEDIUM

CROSS-REFERENCE TO RELATED APPLICATION

The present disclosure claims the priority of Chinese patent application filed on Mar. 20, 2023 before the CNIPA, China National Intellectual Property Administration with the application number of 202310271383.5, and the title of "METHOD AND APPARATUS FOR ACCESSING A VIRTUAL IP ADDRESS ACROSS CLUSTERS, ELECTRONIC DEVICE AND STORAGE MEDIUM", which is incorporated herein in its entirety by reference.

FIELD

The present disclosure relates to the field of communication technologies, and more particularly to a method for accessing a virtual internet protocol (IP) address across clusters, an apparatus for accessing a virtual IP address across clusters, an electronic device and a computer non-transitory readable storage medium.

BACKGROUND

Virtual machines in a cluster can communicate with each other through a layer 2 network, and clusters can communicate with each other through a layer 3 network. In the layer 2 network, communications can be implemented only through media access control (MAC) addressing; and in the layer 3 network, cross-network-segment communications need to be implemented through IP routing, and thus communication can be performed across clusters.

However, when implementing an interworking of the layer 3 network through virtual IP addresses on the virtual machines, a virtual IP address assigned to a virtual machine in a certain cluster cannot be sensed by virtual machines on other clusters, and it is necessary for staff need to manually configure static routing of the virtual IP address on a control plane before being sensed and used by the virtual machines on other clusters, and thus operations are complex and inefficient.

SUMMARY

Embodiments of the present disclosure provide a method and an apparatus for accessing a virtual internet protocol (IP) address across clusters, an electronic device and a computer non-transitory readable storage medium, so as to solve problems of complex operations and low efficiency when manually configuring static routing of the virtual IP address by the staff.

The embodiments of the present disclosure disclose a method for accessing a virtual internet protocol (IP) address across clusters, applied to a gateway node of a first cluster, where the first cluster is connected to a second cluster through a router, and the method includes:

matching a received packet with a flow table, where the packet carries a virtual IP address and a media access control (MAC) address corresponding to the virtual IP address; and in response to the packet being successfully matched with a first flow entry in the flow table, determining that the virtual IP address drifts into a virtual machine in the first cluster, and adding static routing corresponding to the virtual IP address to a router of the second cluster according to the virtual IP address and the MAC address corresponding to the virtual IP address to enable the second cluster to access the virtual IP address in the first cluster.

In some embodiments of the present disclosure, after matching the received packet with the flow table, the method further includes:

in response to the packet being successfully matched with a second flow entry in the flow table, determining that the virtual IP address drifts into a virtual machine in the second cluster, deleting the static routing corresponding to the virtual IP address on the router of the second cluster, and adding the static routing corresponding to the virtual IP address to a router of the first cluster according to the virtual IP address and the MAC address corresponding to the virtual IP address.

In some embodiments of the present disclosure, before matching the received packet with the flow table, the method further includes:

establishing the first flow entry in the flow table, where the first flow entry is configured to sense an occurrence of the virtual IP address in the first cluster;

after determining that the virtual IP address drifts into the virtual machine in the first cluster, the method further includes:

establishing the second flow entry in the flow table, where the second flow entry is configured to sense an occurrence of the virtual IP address in the second cluster; and after determining that the virtual IP address drifts into the virtual machine in the second cluster, the method further includes:

deleting the second flow entry.

In some embodiments of the present disclosure, before matching the received packet with the flow table, the method further includes:

establishing the first flow entry and the second flow entry in the flow table, where the first flow entry is configured to sense an occurrence of the virtual IP address in the first cluster, and the second flow entry is configured to sense an occurrence of the virtual IP address in the second cluster.

In some embodiments of the present disclosure, the flow table includes a first flow table and a second flow table, the first flow entry is located in the first flow table, and the second flow entry is located in the second flow table.

In some embodiments of the present disclosure, after determining that the virtual IP address drifts into the virtual machine in the first cluster, the method further includes:

establishing a third flow entry in the first flow table according to the virtual IP address and the MAC address corresponding to the virtual IP address; and after determining that the virtual IP address drifts into the virtual machine in the second cluster, the method further includes:

deleting the third flow entry.

In some embodiments of the present disclosure, after establishing the third flow entry in the first flow table according to the virtual IP address and the MAC address, the method further includes:

in response to a new packet being successfully matched with the third flow entry and a MAC address corresponding to the virtual IP address in the new packet being different from a MAC address corresponding to the virtual IP address in the third flow entry, determining that the virtual IP address drifts in the first cluster, and updating the MAC address corresponding to the virtual IP address in the third flow entry according to the MAC address corresponding to the virtual IP address in the new packet.

In some embodiments of the present disclosure, the packet is first matched with the third flow entry in response to a coexistence of the first flow entry and the third flow entry.

In some embodiments of the present disclosure, the first flow table is pre-established with a fourth flow entry, and matching the received packet with the flow table includes:

matching the packet with the fourth flow entry in response to the packet being sent by the first cluster;

determining that the packet carries an IP address and the MAC address corresponding to the IP address under the condition that the matching between the packet and the fourth flow entry succeeds; and matching the packet with the first flow entry under the condition that the matching between the packet and the fourth flow entry fails.

In some embodiments of the present disclosure, after determining that the virtual IP address drifts into the virtual machine in the second cluster, the method further includes:

recording the virtual IP address and the MAC address corresponding to the virtual IP address through the second flow entry; and after adding the static routing corresponding to the virtual IP address to the router of the first cluster according to the virtual IP address and the MAC address, the method further includes:

in response to a new packet being successfully matched with the second flow entry and a MAC address corresponding to the virtual IP address in the new packet being different from a MAC address corresponding to the virtual IP address in the second flow entry, determining that the virtual IP address drifts in the second cluster, and updating the MAC address corresponding to the virtual IP address in the second flow entry according to the MAC address corresponding to the virtual IP address in the new packet.

In some embodiments of the present disclosure, the packet includes an IP packet or an address resolution protocol (ARP) packet.

In some embodiments of the present disclosure, the ARP packet is broadcast by the virtual machine when the virtual IP address drifts into the virtual machine.

In some embodiments of the present disclosure, adding the static routing corresponding to the virtual IP address to the router of the second cluster according to the virtual IP address and the MAC address corresponding to the virtual IP address includes:

adding the virtual IP address and the MAC address corresponding to the virtual IP address to a cluster shared database to enable the second cluster to obtain the virtual IP address and the MAC address corresponding to the virtual IP address from the cluster shared database, and adding the static routing corresponding to the virtual IP address to the router of the second cluster according to the virtual IP address and the MAC address corresponding to the virtual IP address.

In some embodiments of the present disclosure, deleting the static routing corresponding to the virtual IP address on the router of the second cluster includes:

deleting the virtual IP address and the MAC address corresponding to the virtual IP address from the cluster shared database to enable the second cluster to delete the static routing corresponding to the virtual IP address on the router of the second cluster after sensing that the virtual IP address and the MAC address corresponding to the virtual IP address in the cluster shared database are deleted.

In some embodiments of the present disclosure, the router is configured with a static routing table, and the static routing table is configured to store the static routing corresponding to the virtual IP address.

In some embodiments of the present disclosure, each of the first cluster and the second cluster includes a first router and a second router, where the first router is configured to realize communication connection between the first cluster and the second cluster, and the second router is configured to realize communication connection between virtual machines in the first cluster or the second cluster.

In some embodiments of the present disclosure, after determining that the virtual IP address drifts into the virtual machine in the first cluster, the method further includes:

adding a mapping relationship between the virtual IP address and the MAC address corresponding to the virtual IP address to the second router of the first cluster.

In some embodiments of the present disclosure, the gateway node includes an l2gateway node.

In some embodiments of the present disclosure, a control agent is deployed in the l2gateway node.

Some embodiments of the present disclosure further disclose an apparatus for accessing a virtual internet protocol (IP) address across clusters, applied to a gateway node of a first cluster, where the first cluster is connected to a second cluster through a router, and the apparatus includes:

a packet matching module configured to match a received packet with a flow table, where the packet carries a virtual IP address and a media access control (MAC) address corresponding to the virtual IP address; and a first static routing adding module configured to in response to the packet being successfully matched with a first flow entry in the flow table, determine that the virtual IP address drifts into a virtual machine in the first cluster, and add static routing corresponding to the virtual IP address to a router of the second cluster according to the virtual IP address and the MAC address corresponding to the virtual IP address to enable the second cluster to access the virtual IP address in the first cluster.

In some embodiments of the present disclosure, the apparatus further includes:

a second static routing adding module configured to in response to the packet being successfully matched with a second flow entry in the flow table, determine that the virtual IP address drifts into a virtual machine in the second cluster, delete the static routing corresponding to the virtual IP address on the router of the second cluster, and add the static routing corresponding to the virtual IP address to a router of the first cluster according to the virtual IP address and the MAC address corresponding to the virtual IP address.

In some embodiments of the present disclosure, the apparatus further includes:

a first flow entry establishing module configured to establish the first flow entry in the flow table, where the first flow entry is configured to sense an occurrence of the virtual IP address in the first cluster;

a second flow entry establishing module configured to establish the second flow entry in the flow table, where the second flow entry is configured to sense an occurrence of the virtual IP address in the second cluster; and

a first flow entry deleting module configured to delete the second flow entry.

In some embodiments of the present disclosure, the apparatus further includes:

a flow entry establishing module configured to establish the first flow entry and the second flow entry in the flow table, where the first flow entry is configured to sense an occurrence of the virtual IP address in the first cluster, and the second flow entry is configured to sense an occurrence of the virtual IP address in the second cluster.

In some embodiments of the present disclosure, the flow table includes a first flow table and a second flow table, the first flow entry is located in the first flow table, and the second flow entry is located in the second flow table.

In some embodiments of the present disclosure, the apparatus further includes:

a third flow entry establishing module configured to establish a third flow entry in the first flow table according to the virtual IP address and the MAC address corresponding to the virtual IP address; and a third flow entry deleting module configured to delete the third flow entry.

In some embodiments of the present disclosure, the apparatus further includes:

a static routing updating module configured to in response to a new packet being successfully matched with the third flow entry and a MAC address corresponding to the virtual IP address in the new packet being different from a MAC address corresponding to the virtual IP address in the third flow entry, determining that the virtual IP address drifts in the first cluster, and updating the MAC address corresponding to the virtual IP address in the third flow entry according to the MAC address corresponding to the virtual IP address in the new packet.

In some embodiments of the present disclosure, the packet is first matched with the third flow entry in response to a coexistence of the first flow entry and the third flow entry.

In some embodiments of the present disclosure, the first flow table is pre-established with a fourth flow entry, and the packet matching module includes:

a first packet matching submodule configured to match the packet with the fourth flow entry in response to the packet being sent by the first cluster;

an address determining submodule configured to determine that the packet carries an IP address and the MAC address corresponding to the IP address under the condition that the matching between the packet and the fourth flow entry succeeds; and a second packet matching submodule configured to match the packet with the first flow entry under the condition that the matching between the packet and the fourth flow entry fails.

In some embodiments of the present disclosure, the apparatus further includes:

an information recording module configured to record the virtual IP address and the MAC address corresponding to the virtual IP address through the second flow entry; and the static routing updating module is further configured to in response to a new packet being successfully matched with the second flow entry and a MAC address corresponding to the virtual IP address in the new packet being different from a MAC address corresponding to the virtual IP address in the second flow entry, determine that the virtual IP address drifts in the second cluster, and update the MAC address corresponding to the virtual IP address in the second flow entry according to the MAC address corresponding to the virtual IP address in the new packet.

In some embodiments of the present disclosure, the packet includes an IP packet or an address resolution protocol (ARP) packet.

In some embodiments of the present disclosure, the ARP packet is broadcast by the virtual machine when the virtual IP address drifts into the virtual machine.

In some embodiments of the present disclosure, the first static routing adding module includes:

a data adding submodule configured to add the virtual IP address and the MAC address corresponding to the virtual IP address to a cluster shared database to enable the second cluster to obtain the virtual IP address and the MAC address corresponding to the virtual IP address from the cluster shared database, and add the static routing corresponding to the virtual IP address to the router of the second cluster according to the virtual IP address and the MAC address corresponding to the virtual IP address.

In some embodiments of the present disclosure, the second static routing adding module includes:

a data deleting submodule configured to delete the virtual IP address and the MAC address corresponding to the virtual IP address from the cluster shared database to enable the second cluster to delete the static routing corresponding to the virtual IP address on the router of the second cluster after sensing that the virtual IP address and the MAC address corresponding to the virtual IP address in the cluster shared database are deleted.

In some embodiments of the present disclosure, the router is configured with a static routing table, and the static routing table is configured to store the static routing corresponding to the virtual IP address.

In some embodiments of the present disclosure, each of the first cluster and the second cluster includes a first router and a second router, where the first router is configured to realize communication connection between the first cluster and the second cluster, and the second router is configured to realize communication connection between virtual machines in the first cluster or the second cluster.

In some embodiments of the present disclosure, the apparatus further includes:

a mapping relationship adding module configured to add a mapping relationship between the virtual IP address and the MAC address corresponding to the virtual IP address to the second router of the first cluster.

In some embodiments of the present disclosure, the gateway node includes an l2gateway node.

In some embodiments of the present disclosure, a control agent is deployed in the l2gateway node.

The embodiments of the present disclosure further disclose an electronic device, including: a processor, a communication interface, a memory and a communication bus, where the processor, the communication interface and the memory communicate with each other through the communication bus;

the memory is configured to store computer programs; and the processor is configured to implement the method described in the embodiments of the present disclosure when executing the computer programs stored on the memory.

The embodiments of the present disclosure further disclose a computer non-transitory readable storage medium having instructions stored thereon, where the instructions, when executed by one or more processors, cause the processors to perform the method described in the embodiments of the present disclosure.

The embodiments of the present disclosure include following advantages: it is determined that the virtual IP address drifts to the first cluster by matching the first flow entry in the flow table with the packet, and the static routing corresponding to the virtual IP address in the second cluster is configured according to a location of the cluster where the virtual IP address is located, so that virtual machines or devices in the second cluster are capable of accessing the virtual IP address in the first cluster across clusters without the need for staff to manually configure the static routing of the virtual IP address on the control plane, thereby solving the problems of complex operations and low efficiency when manually configuring static routing of the virtual IP address by the staff.

BRIEF DESCRIPTION OF THE DRAWINGS

FIG. 1 is a block diagram of a communication design of a virtual IP address in a data plane provided in some embodiments of the present disclosure.

FIG. 2 is a flowchart of steps of a method for accessing a virtual internet protocol (IP) address across clusters provided in some embodiments of the present disclosure.

FIG. 3 is a block diagram of another communication design of a virtual IP address in a data plane provided in some embodiments of the present disclosure.

FIG. 4 is a schematic flowchart of a control plane disclosed in some embodiments of the present disclosure.

DETAILED DESCRIPTION

Figure 5:
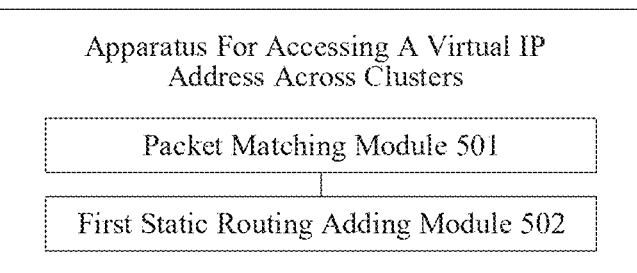
FIG. 5 is a block diagram of a structure of an apparatus for accessing a virtual internet protocol (IP) address across clusters provided in some embodiments of the present disclosure.

In order to make the objectives, features, and advantages of the present disclosure more obvious and easy to understand, the present disclosure will be described in further detail below with reference to the accompanying drawings and specific embodiments.

At present, cross-cluster interconnection can be realized through l2gateway of open virtual network (ovn, which is an open source software defined network (SDN) controller for OpenvSwitch) and open virtual network inter-connection (ovn-ic, which is a controller for ovn to realize multi-ovn cluster interconnection). Multiple clusters can use a same network segment to create ports and virtual machines. The virtual machines can communicate with each other through layer 2. After multiple layer 2 networks are connected through routers, they can also communicate with each other through layer 3. However, the current premise for realizing the interoperability between layer 2 and layer is that an IP of a virtual machine is fixed in a certain cluster, and other clusters know the cluster where the IP is located. Once an IP is assigned to a virtual machine, it cannot be used by virtual machines in other clusters without being reassigned through a control plane, and thus a scenario of the virtual IP address cannot be realized. For highly available applications such as keepalived, a virtual IP address is required.

Based on this, in some embodiments of the present disclosure, a virtual IP address is designed to be used in large layer 2 network across openstack (open source cloud computing platform management platform project) clusters. The virtual IP address can be accessed by other IP addresses in the large layer 2 network of each cluster or other networks connected through routers.

In a network structure, there are two choices, namely layer 2 network and layer 3 network. A structure of the layer 2 network includes a core layer and an access layer, and a structure of the layer 3 network includes a core layer, an aggregation layer and an access layer.

A mode of the structure of the layer 2 network including only the core layer and the access layer is simple to operate. A switch forwards data packets according to a media access control (MAC) address table. If there is a data packet, the data packet is forwarded; and if there is no data packet, flooding is performed, that is, the data packet is broadcast and sent to all ports. If a destination terminal receives and responds, the switch can add a MAC address to the address table, which is a process of establishing the MAC address by the switch.

Different from the structure of the layer 2 network, the structure of the layer 3 network can form a large network. The core layer is a supporting backbone and a data transmission channel of the entire network. The aggregation layer connects the core layer of the network with various accessed application layers, and plays a role of "medium transmission" between the two layers. An object-oriented of the access layer is mainly end customers, and the access layer provides access functions for the end customers (workstations are connected to the network). In the layer 2 network, communications can be implemented only through MAC addressing, but only in a same conflict domain; and the layer 3 network, cross-network-segment communications need to be implemented through IP routing, which may span multiple conflict domains.

Referring to FIG. 1, FIG. 1 is a block diagram of a communication design of a virtual IP address in a data plane provided in some embodiments of the present disclosure. Both cluster A and cluster B use two network segments, namely 192.168.1.0/24 and 192.168.2.0/24, where 192.168.1.10 is a virtual IP address, and the virtual IP address and 192.168.1.3 are on a same virtual machine at this point. When virtual machines in other network segments of the same cluster communicate with the virtual IP address, it only needs to use a router (VPC Router) in this cluster and ensure that a MAC_binding table of a router interface is correct. If an IP address of the cluster B is to communicate with the virtual IP address, it is necessary to configure static routing of 192.168.1.10 on a router of the cluster B, so as to realize data transmission between devices in the cluster B with the virtual IP address based on the static routing.

Referring to FIG. 2, FIG. 2 is a flowchart of steps of a method for accessing a virtual internet protocol (IP) address across clusters provided in some embodiments of the present disclosure. The method includes following steps.

Step 201, a received packet is matched with a flow table.

The method for accessing the virtual IP address across clusters is applied to a gateway node of a first cluster. The first cluster is connected to a second cluster through a router. For example, both the first cluster and the second cluster have interconnection routers, and thus communication connection between the first cluster and the second cluster can be realized through the two interconnection routers. There may be a plurality of second clusters.

Information carried by the packet includes a virtual IP address and a MAC address corresponding to the virtual IP address, as well as a virtual local area network (VLAN).

The packet is actively sent by a virtual machine to which the virtual IP address drifts, and the gateway node is capable of sensing this data packet.

The flow table is an ovs (OpenvSwitch) flow table, and the flow table is provided with multiple levels of flow entries.

After the gateway node obtains the packet, the packet can be matched with flow entries in the flow table. The flow entries have priority, which refers to priority of a flow entry. The packet will try to match a flow entry with high priority first.

Step 202, in response to the packet being successfully matched with a first flow entry in the flow table, it is determined that the virtual IP address drifts into a virtual machine in the first cluster, and static routing corresponding to the virtual IP address is added to a router of the second cluster according to the virtual IP address and the MAC address corresponding to the virtual IP address to enable the second cluster to access the virtual IP address in the first cluster.

The virtual IP address drifts into the virtual machine in the first cluster, which means that virtual IP address can drift into the virtual machine in the first cluster from other clusters (for example, the second cluster), or be newly set in the virtual machine in the first cluster.

The first flow entry is set in the flow table, and the first flow entry is used to sense whether the packet is sent by the first cluster. After the gateway node obtains the packet, the first flow entry is matched with the packet, for example, match the packet, a corresponding VLAN and a network segment. After successful matching, it can be determined that the packet comes from the first cluster, that is, it can be determined that the virtual IP address drifts into the virtual machine in the first cluster.

Therefore, the static routing corresponding to the virtual IP address is added to the router of the second cluster according to the virtual IP address and a MAC address corresponding to the virtual IP address carried in the packet, so that virtual machines or devices in the second cluster can access the virtual IP address in the first cluster through the static routing, thereby realizing data transmission with the virtual machine where the virtual IP address is located.

Meanwhile, if the virtual IP address drifts from the second cluster to the first cluster, there may be the static routing corresponding to the virtual IP address on the router of the first cluster, and thus it is necessary to delete the static routing corresponding to the virtual IP address on the router of the first cluster to save storage resources.

In the above embodiments, it is determined that the virtual IP address drifts to the first cluster by matching the first flow entry in the flow table with the packet, and a configuration of the static routing corresponding to the virtual IP address in the second cluster is updated according to a location of the cluster where the virtual IP address is located, so that virtual machines or devices in the second cluster are capable of accessing the virtual IP address in the first cluster across clusters without the need for staff to manually configure the static routing of the virtual IP address on the control plane, thereby solving the problems of complex operations and low efficiency when manually configuring static routing of the virtual IP address by the staff.

On the basis of the above embodiments, modified embodiments of the above embodiments are proposed. It should be noted here that in order to make the description brief, only differences from the above embodiments are described in the modified embodiments.

In some embodiments of the present disclosure, after matching the received packet with the flow table, the method further includes: in response to the packet being successfully matched with a second flow entry in the flow table, determining that the virtual IP address drifts into a virtual machine in the second cluster, deleting the static routing corresponding to the virtual IP address on the router of the second cluster, and adding the static routing corresponding to the virtual IP address to a router of the first cluster according to the virtual IP address and the MAC address corresponding to the virtual IP address.

The second flow entry is set in the flow table, and the second flow entry is used to sense whether the packet is sent by the second cluster. After the gateway node obtains the packet, the second flow entry is matched with the packet, for example, match the packet, a corresponding VLAN and a network segment. After successful matching, it can be determined that the packet comes from the second cluster, and thus it determined that the virtual IP address drifts from the first cluster to the virtual machine in the second cluster.

Then, the static routing corresponding to the virtual IP address is added to the router of the first cluster according to the virtual IP address and a MAC address corresponding to the virtual IP address carried in the packet, so that virtual machines or devices in the first cluster can access the virtual IP address through the static routing, thereby realizing data transmission with the virtual machine where the virtual IP address is located.

Meanwhile, since the virtual IP address is not in the first cluster, it is necessary to delete the static routing corresponding to the virtual IP address on the router of the second cluster. If the virtual IP address does not drift from the first cluster to the second cluster, but is newly set in the virtual machine in the second cluster, there will be no static routing corresponding to the virtual IP address on the router of the second cluster, and thus it is unnecessary to delete the static routing corresponding to the virtual IP address on the router of the second cluster.

Referring to FIG. 1 again, the virtual IP address 192.168.1.10 is located in the cluster A (the first cluster) at this point, and then the virtual IP address drifts into the cluster B (the second cluster). Referring to FIG. 3, FIG. 3 is a block diagram of another communication design of a virtual IP address in a data plane provided in some embodiments of the present disclosure. When the virtual IP address 192.168.1.10 drifts to the cluster B and is in the same virtual machine as 192.168.1.7, an IP of other clusters such as the cluster A, for example, 192.168.2.5, communicates with the virtual IP address, and thus the router of the cluster A is configured with the static routing of 192.168.1.10. The access path is as follows: 192.168.2.5>a router of the cluster A (VPC Router)>an interconnection router of the cluster A (IC Router)>an interconnection router of the cluster B (IC Router)>a router of the cluster B (VPC Router) >192.168.1.10.

In the above embodiments, in the process of virtual IP address drifting between the first cluster and the second cluster, it is determined that the virtual IP address drifts to the cluster by matching the first flow entry or the second flow entry in the flow table with the packet, and static routing configuration corresponding to the virtual IP address is updated according to a location of the cluster where the virtual IP address is located, so that virtual machines or devices in other clusters are capable of accessing the virtual IP address across clusters without the need for staff to manually configure the static routing of the virtual IP address on the control plane, thereby solving the problems of complex operations and low efficiency when manually configuring static routing of the virtual IP address by the staff.

In some embodiments of the present disclosure, before matching the received packet with the flow table, the method further includes: establishing the first flow entry in the flow table, where the first flow entry is configured to sense an occurrence of the virtual IP address in the first cluster; after determining that the virtual IP address drifts into the virtual machine in the first cluster, the method further includes: establishing the second flow entry in the flow table, where the second flow entry is configured to sense an occurrence of the virtual IP address in the second cluster; and after determining that the virtual IP address drifts into the virtual machine in the second cluster, the method further includes: deleting the second flow entry.

Before matching the received packet with the flow table, that is, before the gateway node receives the packet, the virtual IP address is not in the first cluster at this point, but in the second cluster, it is necessary to establish a first flow entry in the flow table in advance, so as to match the packet sent by the first cluster through the first flow entry and sense the occurrence of the virtual IP address in the first cluster, while the virtual IP address is in the second cluster, and thus it is unnecessary to establish a second flow entry to sense the occurrence of the virtual IP address in the second cluster at this point.

After the first flow entry senses that the virtual IP address drifts into the virtual machine in the first cluster, it means that the virtual IP address may drift into the second cluster next, and thus it is necessary to establish a second flow entry in the flow table to match the packet sent by the second cluster through the second flow entry and sense the occurrence of virtual IP address in the second cluster.

After the second flow entry senses that the virtual IP address drifts into the virtual machine in the second cluster, it means that the virtual IP address is already in the second cluster, and at this point, it is unnecessary to use the second flow entry to sense the occurrence of virtual IP address in the second cluster, and thus the second flow entry is deleted, and the second flow entry is established after the virtual IP address has drifted to the first cluster.

In the above embodiments, it is determined whether the second flow entry needs to be used next according to the location of the cluster where the virtual IP address is located, and the second flow entry is established or deleted to save storage resources.

In some embodiments of the present disclosure, before matching the received packet with the flow table, the method further includes: establishing the first flow entry and the second flow entry in the flow table, where the first flow entry is configured to sense an occurrence of the virtual IP address in the first cluster, and the second flow entry is configured to sense an occurrence of the virtual IP address in the second cluster.

In addition to establishing or deleting according to the location of the cluster where the virtual IP address is located by using the above second flow entry, it is also possible to simultaneously establish the first flow entry and the second flow entry in the flow table before matching the received packet with the flow table, so as to sense the occurrence of virtual IP address in the first cluster through the first flow entry and sense the occurrence of virtual IP address in the second cluster through the second flow entry.

In some embodiments of the present disclosure, the flow table includes a first flow table and a second flow table, the first flow entry is located in the first flow table, and the second flow entry is located in the second flow table.

Two flow tables can be set respectively, namely the first flow table and the second flow table. The first flow entry is established in the first flow table, and the second flow entry is established in the second flow table. The flow entry in the first flow table is used to match the packet sent by the first cluster, and the flow entry in the second flow table is used to match the packet sent by the second cluster.

In some embodiments of the present disclosure, after determining that the virtual IP address drifts into the virtual machine in the first cluster, the method further includes: establishing a third flow entry in the first flow table according to the virtual IP address and the MAC address corresponding to the virtual IP address; and after determining that the virtual IP address drifts into the virtual machine in the second cluster, the method further includes: deleting the third flow entry.

In some embodiments of the present disclosure, after establishing the third flow entry in the first flow table according to the virtual IP address and the MAC address, the method further includes: in response to a new packet being successfully matched with the third flow entry and a MAC address corresponding to the virtual IP address in the new packet being different from a MAC address corresponding to the virtual IP address in the third flow entry, determining that the virtual IP address drifts in the first cluster, and updating the MAC address corresponding to the virtual IP address in the third flow entry according to the MAC address corresponding to the virtual IP address in the new packet.

In some embodiments of the present disclosure, the packet is first matched with the third flow entry in response to a coexistence of the first flow entry and the third flow entry.

After determining that the virtual IP address drifts into the virtual machine in the first cluster, the third flow entry can be established in the first flow table, and the third flow table learns the virtual IP address and a MAC address corresponding to the virtual IP address in the packet. When the gateway node obtains a new packet sent by the first cluster, the new packet will be matched with the third flow entry first.

When the new packet is successfully matched with the third flow entry and the MAC address corresponding to the virtual IP address in the new packet is different from the MAC address corresponding to the virtual IP address in the third flow entry, it means that the virtual IP address is drifting between virtual machines in the first cluster, or the MAC address of the virtual machine where the virtual IP address is located has changed, and thus it is necessary to replace the MAC address corresponding to the virtual IP address in the third flow entry with the MAC address corresponding to the virtual IP address in the new packet, so as to update the MAC address corresponding to the virtual IP address in the third flow entry without matching the first flow entry in the future.

When the new packet is successfully matched with the third flow entry and the MAC address corresponding to the virtual IP address in the new packet is the same as the MAC address corresponding to the virtual IP address in the third flow entry, it means that the virtual IP address has not drifted, and thus it is unnecessary to match the first flow entry in the future.

When the new packet is not successfully matched with the third flow entry, it is determined that the virtual IP address in the new packet is a virtual IP address not learned by the third flow entry, and thus the new packet is matched with the first flow table to determine whether the virtual IP address is a virtual IP address that has just drifted to the first cluster.

After determining that the virtual IP address drifts into the virtual machine in the second cluster, it means that it is unnecessary to use the third flow entry to sense whether the virtual IP address drifts in the virtual machines in the first cluster, and thus the third flow entry may be deleted to save storage resources.

In the above embodiments, after the packet is successfully matched with the first flow entry, the virtual IP address drifting to the first cluster may be learned through the third flow entry; when the gateway node obtains the new packet, the new packet will be matched with the third flow table; if the new packet is successfully matched with the third flow table, it means that the virtual IP address in the new packet has already been matched with the first flow entry, and thus it is unnecessary to match the new packet with the first flow entry in the future, which simplifies the matching process of the packet and saves computing resources.

In addition, after the packet is successfully matched with the third flow table and the MAC address corresponding to the virtual IP address in the new packet is different from the MAC address corresponding to the virtual IP address in the third flow entry, it means that the virtual IP address drifts in the virtual machines in the first cluster, the MAC address corresponding to the virtual IP address is updated to ensure that other virtual machines or devices may access the virtual machine corresponding to the virtual IP address without the need for staff to manually update the MAC address corresponding to the virtual IP address, thereby solving the problems of complex operations and low efficiency when manually configuring the mapping relationship between the virtual IP address and the MAC address corresponding to the virtual IP address.

In some embodiments of the present disclosure, the first flow table is pre-established with a fourth flow entry, and matching the received packet with the flow table includes: matching the packet with the fourth flow entry in response to the packet being sent by the first cluster; determining that the packet carries an IP address and the MAC address corresponding to the IP address under the condition that the matching between the packet and the fourth flow entry succeeds; and matching the packet with the first flow entry under the condition that the matching between the packet and the fourth flow entry fails.

The first flow table is also pre-established with the fourth flow entry, and the fourth flow entry is used to match the packet, a corresponding vlan and IPs used in the first cluster, and then jump to the next table.

When the packet is sent by the first cluster, the packet will be matched with the fourth flow entry first; if the matching between the packet and the fourth flow entry succeeds, it is determined that the packet carries the IP address and the MAC address corresponding to the IP address, and does not carry the virtual IP address, and thus it is unnecessary to match the packet with the first flow entry in the future, which simplifies the matching process of the packet and saves computing resources.

If the matching between the packet and the fourth flow entry fails, it means that the packet may carry the virtual IP address, and thus the packet is matched with the first flow entry to determine whether there is the virtual IP address that has just drifted to the first cluster in the packet.

In the above embodiments, when the packet is sent by the first cluster, the packet will be matched with the fourth flow entry first; if the matching between the packet and the fourth flow entry succeeds, it is determined that the packet carries the IP address and the MAC address corresponding to the IP address, and does not carry the virtual IP address, and thus it is unnecessary to match the packet with the first flow entry in the future, which simplifies the matching process of the packet and saves computing resources.

In some embodiments of the present disclosure, after determining that the virtual IP address drifts into the virtual machine in the second cluster, the method further includes: recording the virtual IP address and the MAC address corresponding to the virtual IP address through the second flow entry; and after adding the static routing corresponding to the virtual IP address to the router of the first cluster according to the virtual IP address and the MAC address, the method further includes: in response to a new packet being successfully matched with the second flow entry and a MAC address corresponding to the virtual IP address in the new packet being different from a MAC address corresponding to the virtual IP address in the second flow entry, determining that the virtual IP address drifts in the second cluster, and updating the MAC address corresponding to the virtual IP address in the second flow entry according to the MAC address corresponding to the virtual IP address in the new packet.

After determining that the virtual IP address drifts to virtual machines in the second cluster, it is also necessary to learn the virtual IP address and the MAC address corresponding to the virtual IP address in the packet through the second flow entry, so as to subsequently sense whether the virtual IP address drifts between virtual machines in the second cluster through the second flow entry.

After adding the static routing corresponding to the virtual IP address to the router of the first cluster according to the virtual IP address and the MAC address in the packet, if the new packet is successfully matched with the second flow entry and the MAC address corresponding to the virtual IP address in the new packet is different from the MAC address corresponding to the virtual IP address in the second flow entry, it means that the virtual IP address is drifting between virtual machines in the second cluster, or the MAC address of the virtual machine where the virtual IP address is located has changed, and thus it is necessary to replace the MAC address corresponding to the virtual IP address in the second flow entry with the MAC address corresponding to the virtual IP address in the new packet, so as to update the MAC address corresponding to the virtual IP address in the second flow entry, so that other virtual machines or devices may access the virtual machine corresponding to the virtual IP address.

When the new packet is successfully matched with the second flow entry and the MAC address corresponding to the virtual IP address in the new packet is the same as the MAC address corresponding to the virtual IP address in the second flow entry, it means that the virtual IP address has not drifted.

In the above embodiments, after the packet is successfully matched with the second flow entry, the virtual IP address drifting to the second cluster may be learned through the second flow entry; when the gateway node obtains the new packet, the new packet will be matched with the second flow entry; if the new packet is successfully matched with the second flow entry and the virtual IP address in the new packet is the virtual IP address that has been learned in the second flow entry, it is determined that the virtual IP address in the new packet has already been matched with the second flow entry, and thus it is unnecessary to delete the static routing corresponding to the virtual IP address on the router of the second cluster, and add the static routing corresponding to the virtual IP address on the router of the first cluster according to the virtual IP address and a MAC address corresponding to the virtual IP address in the future, which simplifies the matching process of the packet and saves computing resources.

In some embodiments of the present disclosure, the packet includes an IP packet or an address resolution protocol (ARP) packet.

In some embodiments of the present disclosure, the ARP packet is broadcast by the virtual machine when the virtual IP address drifts into the virtual machine.

When the virtual IP address drifts into the virtual machine, the virtual machine will actively broadcast and send a free ARP packet to announce the virtual IP address, and the gateway node can sense this data packet. Before the virtual machine actively sends an ARP packet, it may also send a data IP packet first. The IP packet also carries the virtual IP address and a MAC address corresponding to the virtual IP address, and may also inform the virtual IP address.

Correspondingly, corresponding to the IP packet and the ARP packet, the first flow entry, the second flow entry and the third flow entry are all set to two types, which are used to match the IP packet and the ARP packet respectively to sense the location of virtual IP address.

In some embodiments of the present disclosure, adding the static routing corresponding to the virtual IP address to the router of the second cluster according to the virtual IP address and the MAC address corresponding to the virtual IP address includes: adding the virtual IP address and the MAC address corresponding to the virtual IP address to a cluster shared database to enable the second cluster to obtain the virtual IP address and the MAC address corresponding to the virtual IP address from the cluster shared database, and adding the static routing corresponding to the virtual IP address to the router of the second cluster according to the virtual IP address and the MAC address corresponding to the virtual IP address.

After determining that the virtual IP address drifts to the first cluster, it is necessary to share the virtual IP address and the MAC address corresponding to the virtual IP address to the cluster shared database to enable the second cluster to know that the virtual IP address drifts to the first cluster, and add the static routing corresponding to the virtual IP address to the router of the second cluster according to the virtual IP address and the MAC address corresponding to the virtual IP address.

In some embodiments of the present disclosure, deleting the static routing corresponding to the virtual IP address on the router of the second cluster includes:

deleting the virtual IP address and the MAC address corresponding to the virtual IP address from the cluster shared database to enable the second cluster to delete the static routing corresponding to the virtual IP address on the router of the second cluster after sensing that the virtual IP address and the MAC address corresponding to the virtual IP address in the cluster shared database are deleted.

After determining that the virtual IP address drifts to the second cluster, it is necessary to delete the virtual IP address and the MAC address corresponding to the virtual IP address from the cluster shared database to enable the second cluster to know that the virtual IP address drifts to the second cluster, and there is no need for the static routing corresponding to the virtual IP address on the router of the second cluster, and thus the static routing corresponding to the virtual IP address on the router of the second cluster is deleted.

In some embodiments of the present disclosure, the router is configured with a static routing table, and added static routings are stored in the static routing table.

In some embodiments of the present disclosure, each of the first cluster and the second cluster includes a first router and a second router, where the first router is configured to realize communication connection between the first cluster and the second cluster, and the second router is configured to realize communication connection between virtual machines in the first cluster or the second cluster.

Referring to FIG. 1 and FIG. 2, the first router is an IC router, and the first router in the first cluster is in communication connection with the first router in the second cluster through a switch (Transit_Switch). The virtual machines in the first cluster or the virtual machines in the second cluster are communicatively connected through a second router (VPC Router). The first router is also in communication connection with the second router through a switch (Logical_Switch).

In some embodiments of the present disclosure, after determining that the virtual IP address drifts into the virtual machine in the first cluster, the method further includes: adding a mapping relationship between the virtual IP address and the MAC address corresponding to the virtual IP address to the second router of the first cluster.

After determining that the virtual IP address drifts into the virtual machine in the first cluster, it is necessary to add the mapping relationship between the virtual IP address and the MAC address corresponding to the virtual IP address to the second router of the first cluster, so that other virtual machines or devices in the first cluster may access the virtual IP address.

In addition, after adding the mapping relationship between the virtual IP address and the MAC address corresponding to the virtual IP address to the second router, when the third flow entry is matched with the new packet and the MAC address corresponding to the virtual IP address in the new packet is different from the MAC address corresponding to the virtual IP address in the third flow entry, it means that the virtual IP address is drifting between virtual machines in the first cluster, the MAC address corresponding to the virtual IP address in the third flow entry, as well as the virtual IP address and the MAC address corresponding to the virtual IP address on the second router are replaced and updated according to the MAC address corresponding to the virtual IP address in the new packet, so that other virtual machines or devices may access the virtual IP address.

In some embodiments of the present disclosure, the gateway node includes an l2gateway node.

In some embodiments of the present disclosure, a control agent is deployed in the l2gateway node.

In order to better understand some embodiments of the present disclosure, exemplary explanations will be made below with reference to FIG. 4.

Design 1 in a Control Plane

At an l2gateway node, a flow table is configured to sense a cluster where a virtual IP address is located and a MAC address of the virtual IP address.

Design reason: at present, when using the virtual IP address, if the virtual IP address drifts, a virtual machine into which the virtual IP address drifts will actively send a free ARP to announce an IP. The l2gateway node can sense this data packet. At the same time, the l2gateway node belongs to an edge node of the cluster and can also sense whether the packet is sent from within the cluster or from other clusters.

Sensing method: a control agent is added at the l2gateway node. As a controller of ovs, the control agent sends the flow table to a network bridge of the l2gateway.

Flow Table Design

First, an ovs flow table is added in a traffic direction from this cluster (the first cluster). The flow table level design of the flow table is as follows:

priority A, match an IP packet, a corresponding VLAN and IPs used in this cluster, and jump to the next table;

priority A, match an ARP packet, a corresponding VLAN and IPs used in this cluster, and jump to the next table;

priority B, match the IP packet, a corresponding VLAN as well as learned virtual IP address and MAC, and jump to the next table;

priority B, match the ARP packet, a corresponding VLAN as well as learned virtual IP address and MAC, and jump to the next table;

priority C, match the IP packet, a corresponding VLAN and a network segment, push to a controller, and jump to the next table; and priority C, match the ARP packet, a corresponding VLAN and a network segment, push to the controller, and jump to the next table, where priority A>priority B>priority C.

The flow table of priority A (the fourth flow entry) is mainly used to match non-virtual IP addresses used in this cluster, so as to ensure that the non-virtual IP addresses are not pushed to the controller or other processing is not added, and thus the addition of this table does not increase additional performance loss.

The flow table of priority B (the third flow entry) is mainly used to match learned virtual IP addresses in this cluster, and MAC is matched during the matching, which is mainly to push to the controller again if the MAC address corresponding to the virtual IP address occurs. At the same time, the addition of this flow table also aims at not pushing to the controller once the virtual IP address is learned, thereby improving processing performance, and ensuring that it is pushed to the controller only at the first packet.

The flow table of priority C (the first flow entry) is mainly used to sense an occurrence of a virtual IP address and push the virtual IP address to the controller in time for processing.

It should be noted that the flow table of priority B is created after the flow table of priority C senses that the virtual IP address appears in this cluster.

Secondly, in a direction of receiving packets from other clusters (the second cluster), an ovs flow table is added before forwarding to the network bridge in this cluster.

Priority D, match the IP packet, a corresponding VLAN and a learned virtual IP, push to the controller, and jump to the next table;

priority D, match the ARP packet, a corresponding VLAN and a learned virtual IP, push to the controller, and jump to the next table;

priority E, jump to the next table;

priority D>priority E;

the flow table of priority D (the second flow entry) is matched with the packets from the other clusters. If the original virtual IP address in this cluster (the (first cluster)) includes the packets sent from other clusters (the second cluster), it means that the virtual IP address has been switched to other clusters, and thus it is necessary to be pushed to the controller in time for processing.

Agent Control Processing

The VLAN, IP and MAC information of the packet are obtained according to the packet.

It is determined whether the packet is from within the cluster or outside the cluster according to the table pushed by the packet.

If the packet is from within the cluster, flow tables with the above priority B and priority D are added in the flow table, and at the same time, a MAC_binding record is added in an ovn-sb database. In the MAC_binding record, datapath is set to a datapath of a network, logical_port is set to a port of the l2gateway, and the IP and the MAC are set according to the packet.

If the packet is from other clusters, flow tables related to priority B and priority D of the IP are deleted in the flow table. At the same time, it is checked whether there are any records related to MAC_binding in ovn sb, and if there are any records related to MAC_binding, the records are deleted.

MAC_binding record design: the current MAC_binding table is used to store a MAC address learned by the router interface, and the l2gateway port will not learn to record IP and MAC information, and thus the design is to bind IP and MAC to the l2gateway interface, which will not affect the original functional design, but also facilitate the later control plane to filter information.

Design 2 in the Control Plane

A neutron server monitors changes of the MAC_binding table through an ovsdb protocol, and only cares that a logical port is l2gateway.

Detection of adding MAC_binding: adding the IP from a shared database of each cluster (for example, open virtual network inter-connection northbound (ovn-ic-nb)) indicates that the IP is in this cluster, and other clusters add static routing corresponding to the IP after sensing the IP from the shared database. It is detected whether the network has a routing interface, and if the network has the routing interface, the MAC_binding table related to the routing interface is updated.

Detection of deleting MAC_binding: deleting the IP from the shared database of each cluster (for example, the ovn-ic-nb) indicates that the IP is removed from this cluster, and the other clusters delete the static routing corresponding to the IP after sensing that the IP is removed from the shared database. It is detected whether the network has a routing interface, and if the network has the routing interface, the MAC_binding table related to the routing interface is deleted.

In the above embodiments, a solution for implementing a virtual IP address in cross-cluster interconnection is provided, which is a common high availability solution and provides underlying guarantee for cross-cluster deployment in some network functions virtualization (NFV) scenarios, thereby improving the competitiveness of cloud products.

At the same time, symmetric links are designed for cross-cluster access of the virtual IP address, all of which are interconnected through routers and ovn-ic. By using control plane sensing data plane packet, all clusters may know the cluster where the virtual IP address is located in time and relevant controls may be updated. Reasonable flow table design may not only ensure relevant sensing, but also not affect the forwarding performance.

It should be noted that for the sake of simplicity, the method embodiments are described as a series of action combinations. However, a person skilled in the art should be aware that the embodiments of the present disclosure are not limited by the order of the described actions, as certain steps may be performed in other orders or simultaneously according to the embodiments of the present disclosure. Secondly, a person skilled in the art should also be aware that the embodiments described in the specification are preferred embodiments, and the actions involved are not necessarily necessary for the embodiments of the present disclosure.

Referring to FIG. 5, FIG. 5 is a block diagram of a structure of an apparatus for accessing a virtual internet protocol (IP) address across clusters provided in some embodiments of the present disclosure. The apparatus is applied to a gateway node of a first cluster, where the first cluster is connected to a second cluster through a router. The apparatus includes:

a packet matching module 501 configured to match a received packet with a flow table, where the packet carries a virtual IP address and a media access control (MAC) address corresponding to the virtual IP address; and a first static routing adding module 502 configured to in response to the packet being successfully matched with a first flow entry in the flow table, determine that the virtual IP address drifts into a virtual machine in the first cluster, and add static routing corresponding to the virtual IP address to a router of the second cluster according to the virtual IP address and the MAC address corresponding to the virtual IP address to enable the second cluster to access the virtual IP address in the first cluster.

In some embodiments of the present disclosure, the apparatus further includes:

a second static routing adding module configured to in response to the packet being successfully matched with a second flow entry in the flow table, determine that the virtual IP address drifts into a virtual machine in the second cluster, delete the static routing corresponding to the virtual IP address on the router of the second cluster, and add the static routing corresponding to the virtual IP address to a router of the first cluster according to the virtual IP address and the MAC address corresponding to the virtual IP address.

In some embodiments of the present disclosure, the apparatus further includes:

a first flow entry establishing module configured to establish the first flow entry in the flow table, where the first flow entry is configured to sense an occurrence of the virtual IP address in the first cluster;

a second flow entry establishing module configured to establish the second flow entry in the flow table, where the second flow entry is configured to sense an occurrence of the virtual IP address in the second cluster; and a first flow entry deleting module configured to delete the second flow entry.

In some embodiments of the present disclosure, the apparatus further includes:

a flow entry establishing module configured to establish the first flow entry and the second flow entry in the flow table, where the first flow entry is configured to sense an occurrence of the virtual IP address in the first cluster, and the second flow entry is configured to sense an occurrence of the virtual IP address in the second cluster.

In some embodiments of the present disclosure, the flow table includes a first flow table and a second flow table, the first flow entry is located in the first flow table, and the second flow entry is located in the second flow table.

In some embodiments of the present disclosure, the apparatus further includes:

a third flow entry establishing module configured to establish a third flow entry in the first flow table according to the virtual IP address and the MAC address corresponding to the virtual IP address; and a third flow entry deleting module configured to delete the third flow entry.

In some embodiments of the present disclosure, the apparatus further includes:

a static routing updating module configured to in response to a new packet being successfully matched with the third flow entry and a MAC address corresponding to the virtual IP address in the new packet being different from a MAC address corresponding to the virtual IP address in the third flow entry, determining that the virtual IP address drifts in the first cluster, and updating the MAC address corresponding to the virtual IP address in the third flow entry according to the MAC address corresponding to the virtual IP address in the new packet.

In some embodiments of the present disclosure, the packet is first matched with the third flow entry in response to a coexistence of the first flow entry and the third flow entry.

In some embodiments of the present disclosure, the first flow table is pre-established with a fourth flow entry, and the packet matching module includes:

a first packet matching submodule configured to match the packet with the fourth flow entry in response to the packet being sent by the first cluster;

an address determining submodule configured to determine that the packet carries an IP address and the MAC address corresponding to the IP address under the condition that the matching between the packet and the fourth flow entry succeeds; and a second packet matching submodule configured to match the packet with the first flow entry under the condition that the matching between the packet and the fourth flow entry fails.

In some embodiments of the present disclosure, the apparatus further includes:

an information recording module configured to record the virtual IP address and the MAC address corresponding to the virtual IP address through the second flow entry; and the static routing updating module is further configured to in response to a new packet being successfully matched with the second flow entry and a MAC address corresponding to the virtual IP address in the new packet being different from a MAC address corresponding to the virtual IP address in the second flow entry, determine that the virtual IP address drifts in the second cluster, and update the MAC address corresponding to the virtual IP address in the second flow entry according to the MAC address corresponding to the virtual IP address in the new packet.

In some embodiments of the present disclosure, the packet includes an IP packet or an address resolution protocol (ARP) packet.

In some embodiments of the present disclosure, the ARP packet is broadcast by the virtual machine when the virtual IP address drifts into the virtual machine.

In some embodiments of the present disclosure, the first static routing adding module includes:

a data adding submodule configured to add the virtual IP address and the MAC address corresponding to the virtual IP address to a cluster shared database to enable the second cluster to obtain the virtual IP address and the MAC address corresponding to the virtual IP address from the cluster shared database, and add the static routing corresponding to the virtual IP address to the router of the second cluster according to the virtual IP address and the MAC address corresponding to the virtual IP address.

In some embodiments of the present disclosure, the second static routing adding module includes:

a data deleting submodule configured to delete the virtual IP address and the MAC address corresponding to the virtual IP address from the cluster shared database to enable the second cluster to delete the static routing corresponding to the virtual IP address on the router of the second cluster after sensing that the virtual IP address and the MAC address corresponding to the virtual IP address in the cluster shared database are deleted.

In some embodiments of the present disclosure, the router is configured with a static routing table, and the static routing table is configured to store the static routing corresponding to the virtual IP address.

In some embodiments of the present disclosure, each of the first cluster and the second cluster includes a first router and a second router, where the first router is configured to realize communication connection between the first cluster and the second cluster, and the second router is configured to realize communication connection between virtual machines in the first cluster or the second cluster.

In some embodiments of the present disclosure, the apparatus further includes:

a mapping relationship adding module configured to add a mapping relationship between the virtual IP address and the MAC address corresponding to the virtual IP address to the second router of the first cluster.

In some embodiments of the present disclosure, the gateway node includes an l2gateway node.

In some embodiments of the present disclosure, a control agent is deployed in the l2gateway node.

The apparatus embodiments are substantially similar to the method embodiments, and thus the description is relatively simple, and the relevant points can be found in part of the description of the method embodiments.

In addition, the embodiments of the present disclosure further provide an electronic device, including: a processor, a memory and a computer program stored in the memory and executable on the processor, where the computer program, when executed by the processor, causes the processor to implement various processes of the above method for accessing the virtual IP address across clusters in the foregoing embodiments, and can achieve the same technical effects. To avoid repetition, details are not described herein again.

The embodiments of the present disclosure further provide a computer non-transitory readable storage medium, on which a computer program is stored, where the computer program, when executed by a processor, causes the processor to implement various processes of the above method for accessing the virtual IP address across clusters in the foregoing embodiments, and can achieve the same technical effects. To avoid repetition, details are not described herein again. For example, the computer non-transitory readable storage medium includes a read-only memory (ROM), a random access memory (RAM), a magnetic disk, an optical disc, or the like.

Figure 6:
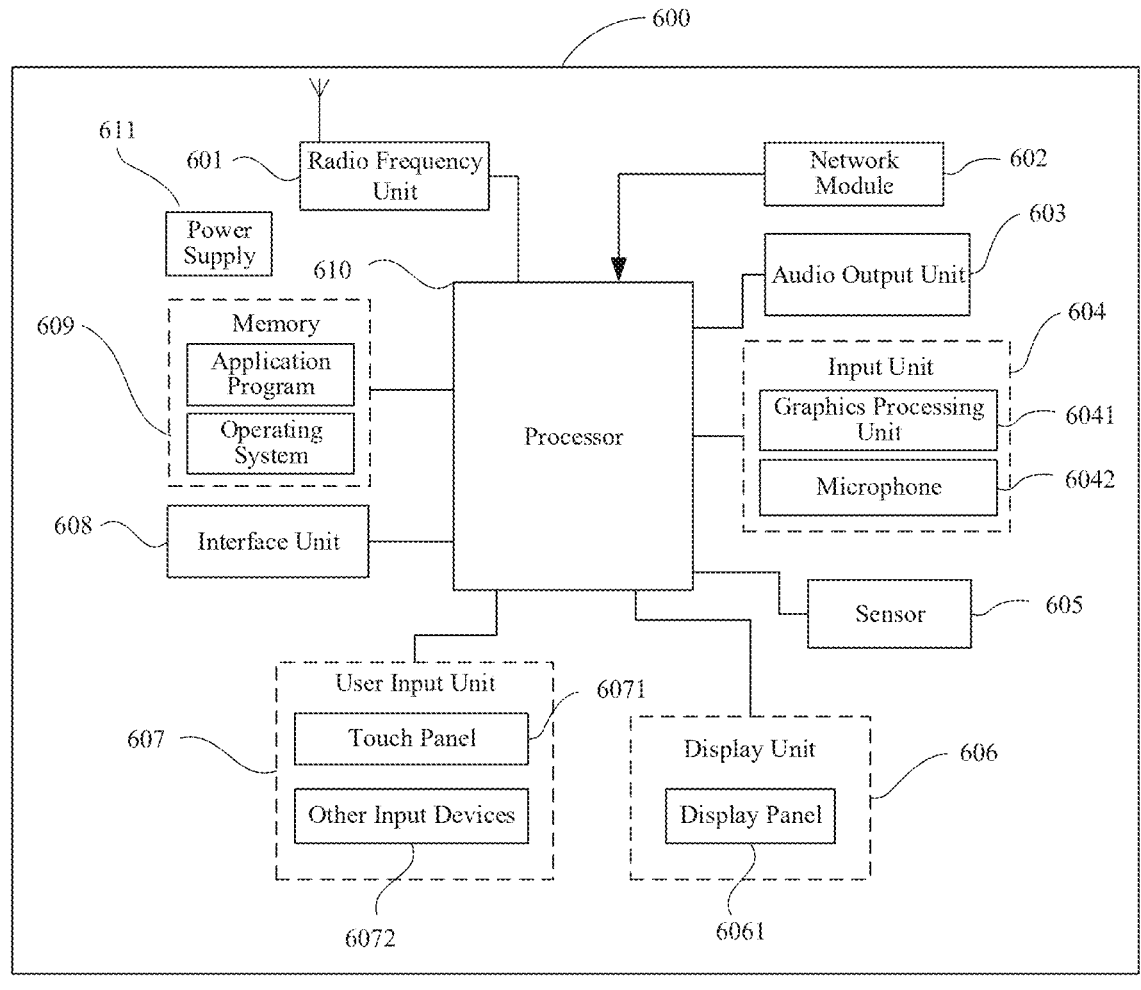
FIG. 6 is a block diagram of an electronic device provided in some embodiments of the present disclosure.

FIG. 6 is a schematic diagram of a hardware structure of an electronic device for implementing various embodiments of the present disclosure.

The electronic device 600 includes but is not limited to a radio frequency unit 601, a network module 602, an audio output unit 603, an input unit 604, a sensor 605, a display unit 606, a user input unit 607, an interface unit 608, a memory 609, a processor 610 and a power supply 611. It can be understood by a person skilled in the art that the structure of the electronic device involved in the embodiments of the present disclosure does not constitute a limitation on the electronic device, and the electronic device can include more or less components than shown in the drawings, or combine some components, or arrange different components. In the embodiments of the present disclosure, the electronic device includes but is not limited to a mobile phone, a tablet computer, a notebook computer, a palmtop computer, a vehicle-mounted terminal, a wearable device, a pedometer, or the like.

It should be understood that in the embodiments of the present disclosure, the radio frequency unit 601 may be configured to receive and transmit information, or to receive and transmit a signal in a call process, and specially, after receiving downlink data from a base station, transmit the downlink data to the processor 610 for processing; and also transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The electronic device provides wireless broadband Internet access for a user by using the network module 602, for example, helping the user send and receive e-mails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal received sound or a message received sound) related to a specific function performed by the electronic device 600. The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capture apparatus (for example, a camera) in a video capture mode or an image capture mode. A processed image frame may be displayed on the display unit 606. The image frame processed by the graphics processing unit 6041 may be stored in the memory 609 (or another storage medium) or transmitted via the radio frequency unit 601 or the network module 602. The microphone 6042 is capable of receiving sounds and processing such sounds into audio data. The processed audio data can be converted, in a telephone call mode, into a format that can be transmitted via the radio frequency unit 601 to a mobile communication base station.

The electronic device 600 further includes at least one sensor 605, for example, an optical sensor, a motion sensor, and other sensors. In the embodiments, the optical sensor includes an ambient light sensor and a proximity sensor. The ambient light sensor may adjust brightness of a display panel 6061 based on intensity of ambient light, and the proximity sensor may turn off the display panel 6061 and/or backlight when the electronic device 600 moves close to an ear. As a type of motion sensor, an accelerometer sensor can detect magnitudes of accelerations in all directions (usually three axes), can detect a magnitude and a direction of gravity when in a static state, and can be applied to posture recognition (for example, screen switching between portrait and landscape, related games, and magnetometer posture calibration) of the electronic device, functions related to vibration recognition (for example, a pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include the display panel 6061. The display panel 6061 may be configured in a form of a liquid crystal display (LCD), an organic light-emitting diode (OLED), or the like.

The user input unit 607 may be configured to: receive input digit or character information and generate key signal input related to user settings and function control of the electronic device. In the embodiments, the user input unit 607 includes a touch panel 6071 and other input devices 6072. The touch panel 6071 is also referred to as a touchscreen, and may collect a touch operation of the user on or near the touch panel (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, transmits the touchpoint coordinates to the processor 610, and can receive a command transmitted by the processor 610 and execute the command. In addition, the touch panel 6071 may be implemented in a plurality of forms, for example, as a resistive, a capacitive, an infrared, or a surface acoustic wave touch panel. The user input unit 607 may further include other input devices 6072 in addition to the touch panel 6071. In the embodiments, the other input devices 6072 may include but are not limited to a physical keyboard, a function button (for example, a volume button or a power on/off button), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 serve as two separate components to implement input and output functions of the electronic device, in some embodiments, the touch panel 6071 and the display panel 6061 may be integrated to implement the input and output functions of the electronic device, and this is not limited herein.

The interface unit 608 is an interface for connecting an external apparatus to the electronic device 600. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 608 may be configured to receive an input (for example, data information or power) from an external apparatus and transmit the received input to one or more elements in the electronic device 600, or may be configured to transmit data between the electronic device 600 and the external apparatus.

The memory 609 may be configured to store software programs and various data. The memory 609 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 609 may include a high-speed random access memory, or may further include a non-transitory memory, for example, at least one magnetic disk storage device, flash memory, or other volatile solid-state storage devices.

The processor 610 is a control center of the electronic device, uses various interfaces and lines to connect all parts of the entire electronic device, and performs various functions and data processing of the electronic device by running or executing the software program and/or module stored in the memory 609 and invoking data stored in the memory 609, thereby performing overall monitoring on the electronic device. The processor 610 may include one or more processing units. In some embodiments of the present disclosure, the processor 610 may integrate an application processor and a modem processor. The application processor mainly processes the operating system, a user interface, an application program, and the like. The modem processor mainly processes wireless communication. In some embodiments, it can be understood that the modem processor may be not integrated in the processor 610.

The electronic device 600 may further include a power supply 611 (for example, a battery) supplying power to the components. In some embodiments of the present disclosure, the power supply 611 may be logically connected to the processor 610 through a power management system, so that functions such as charge management, discharge management, and power consumption management are implemented by using the power management system.

In addition, the electronic device 600 includes some functional modules that are not shown. Details are not described herein.

Figure 7:
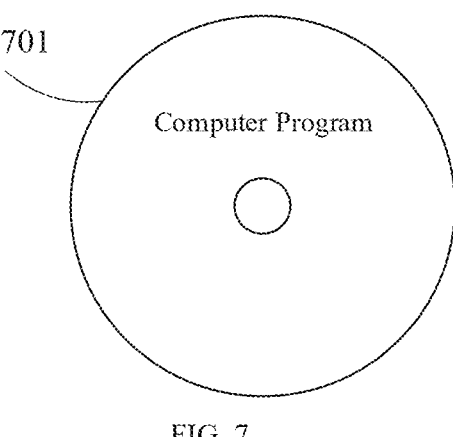
FIG. 7 is a block diagram of a computer non-transitory readable storage medium provided in some embodiments of the present disclosure.

The embodiments of the present disclosure further provide a computer non-transitory readable storage medium. As shown in FIG. 7, the computer non-transitory readable storage medium stores a computer program 701, where the computer program 701, when executed by a processor, causes the processor to implement various processes of the above method for accessing the virtual IP address across clusters in the foregoing embodiments, and can achieve the same technical effects. To avoid repetition, details are not described herein again. For example, the computer non-transitory readable storage medium includes a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the descriptions of the foregoing embodiments, a person skilled in the art can clearly understand that the method in the foregoing embodiments may be implemented by software in combination with a necessary general hardware platform. In some embodiments, the method in the foregoing embodiments may be implemented by hardware. However, in many situations, the former is an example implementation. Based on such an understanding, the technical solutions of the present disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The foregoing describes the embodiments of the present disclosure with reference to the accompanying drawings. However, the present disclosure is not limited to the foregoing specific embodiments. The foregoing specific embodiments are merely illustrative rather than restrictive. As instructed by the present disclosure, a person of ordinary skill in the art may develop many other manners without departing from principles of the present disclosure and the protection scope of the claims, and all such manners fall within the protection scope of the present disclosure.

A person of ordinary skill in the art may be aware that the various exemplary units and algorithm steps described in conjunction with the embodiments disclosed in the embodiments of the present disclosure can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed apparatus and method may be implemented in other manners. For example, the described apparatus embodiment is merely an example. For example, division into the units is merely logical function division and there may be other division in actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of embodiments.

In addition, functional units in embodiments of the present disclosure may be integrated into one unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in embodiments of the present disclosure. The storage medium may include but is not limited to any medium that can store program code, for example, a USB flash disk, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for accessing a virtual internet protocol (IP) address across clusters, applied to a gateway node of a first cluster, wherein the first cluster is connected to a second cluster through a router, and the method comprises:

matching a received packet with a flow table, wherein the packet carries a virtual IP address and a media access control (MAC) address corresponding to the virtual IP address; and in response to the packet being successfully matched with a first flow entry in the flow table, determining that the virtual IP address drifts into a virtual machine in the first cluster, and adding static routing corresponding to the virtual IP address to a router of the second cluster according to the virtual IP address and the MAC address corresponding to the virtual IP address to enable the second cluster to access the virtual IP address in the first cluster.

2. The method according to claim 1, wherein after matching the received packet with the flow table, the method further comprises:

in response to the packet being successfully matched with a second flow entry in the flow table, determining that the virtual IP address drifts into a virtual machine in the second cluster, deleting the static routing corresponding to the virtual IP address on the router of the second cluster, and adding the static routing corresponding to the virtual IP address to a router of the first cluster according to the virtual IP address and the MAC address corresponding to the virtual IP address.

3. The method according to claim 2, wherein the flow table comprises a first flow table and a second flow table, the first flow entry is located in the first flow table, and the second flow entry is located in the second flow table.

4. The method according to claim 3, wherein after determining that the virtual IP address drifts into the virtual machine in the first cluster, the method further comprises:

establishing a third flow entry in the first flow table according to the virtual IP address and the MAC address corresponding to the virtual IP address; and after determining that the virtual IP address drifts into the virtual machine in the second cluster, the method further comprises:

deleting the third flow entry.

5. The method according to claim 4, wherein after establishing the third flow entry in the first flow table according to the virtual IP address and the MAC address, the method further comprises:

in response to a new packet being successfully matched with the third flow entry and a MAC address corresponding to the virtual IP address in the new packet being different from a MAC address corresponding to the virtual IP address in the third flow entry, determining that the virtual IP address drifts in the first cluster, and updating the MAC address corresponding to the virtual IP address in the third flow entry according to the MAC address corresponding to the virtual IP address in the new packet.

6. The method according to claim 4, wherein the packet is first matched with the third flow entry in response to a coexistence of the first flow entry and the third flow entry.

7. The method according to claim 3, wherein the first flow table is pre-established with a fourth flow entry, and matching the received packet with the flow table comprises:

matching the packet with the fourth flow entry in response to the packet being sent by the first cluster;

determining that the packet carries an IP address and the MAC address corresponding to the IP address under the condition that the matching between the packet and the fourth flow entry succeeds; and matching the packet with the first flow entry under the condition that the matching between the packet and the fourth flow entry fails.

8. The method according to claim 2, wherein adding the static routing corresponding to the virtual IP address to the router of the second cluster according to the virtual IP address and the MAC address corresponding to the virtual IP address comprises:

adding the virtual IP address and the MAC address corresponding to the virtual IP address to a cluster shared database to enable the second cluster to obtain the virtual IP address and the MAC address corresponding to the virtual IP address from the cluster shared database, and adding the static routing corresponding to the virtual IP address to the router of the second cluster according to the virtual IP address and the MAC address corresponding to the virtual IP address.

9. The method according to claim 8, wherein deleting the static routing corresponding to the virtual IP address on the router of the second cluster comprises:

deleting the virtual IP address and the MAC address corresponding to the virtual IP address from the cluster shared database to enable the second cluster to delete the static routing corresponding to the virtual IP address on the router of the second cluster after sensing that the virtual IP address and the MAC address corresponding to the virtual IP address in the cluster shared database are deleted.

10. The method according to claim 2, wherein before matching the received packet with the flow table, the method further comprises:

establishing the first flow entry in the flow table, wherein the first flow entry is configured to sense an occurrence of the virtual IP address in the first cluster;

after determining that the virtual IP address drifts into the virtual machine in the first cluster, the method further comprises:

establishing the second flow entry in the flow table, wherein the second flow entry is configured to sense an occurrence of the virtual IP address in the second cluster; and after determining that the virtual IP address drifts into the virtual machine in the second cluster, the method further comprises:

deleting the second flow entry.

11. The method according to claim 2, wherein before matching the received packet with the flow table, the method further comprises:

establishing the first flow entry and the second flow entry in the flow table, wherein the first flow entry is configured to sense an occurrence of the virtual IP address in the first cluster, and the second flow entry is configured to sense an occurrence of the virtual IP address in the second cluster.

12. The method according to claim 2, wherein after determining that the virtual IP address drifts into the virtual machine in the second cluster, the method further comprises:

recording the virtual IP address and the MAC address corresponding to the virtual IP address through the second flow entry; and after adding the static routing corresponding to the virtual IP address to the router of the first cluster according to the virtual IP address and the MAC address, the method further comprises:

in response to a new packet being successfully matched with the second flow entry and a MAC address corresponding to the virtual IP address in the new packet being different from a MAC address corresponding to the virtual IP address in the second flow entry, determining that the virtual IP address drifts in the second cluster, and updating the MAC address corresponding to the virtual IP address in the second flow entry according to the MAC address corresponding to the virtual IP address in the new packet.

13. The method according to claim 1, wherein the packet comprises an IP packet or an address resolution protocol (ARP) packet.

14. The method according to claim 13, wherein the ARP packet is broadcast by the virtual machine when the virtual IP address drifts into the virtual machine.

15. The method according to claim 1, wherein each of the first cluster and the second cluster comprises a first router and a second router, wherein the first router is configured to realize communication connection between the first cluster and the second cluster, and the second router is configured to realize communication connection between virtual machines in the first cluster or the second cluster.

16. The method according to claim 15, wherein after determining that the virtual IP address drifts into the virtual machine in the first cluster, the method further comprises:

adding a mapping relationship between the virtual IP address and the MAC address corresponding to the virtual IP address to the second router of the first cluster.

17. An electronic device, comprising: a processor, a communication interface, a memory and a communication bus, wherein the processor, the communication interface and the memory communicate with each other through the communication bus;

the memory is configured to store computer programs; and the processor is configured to implement the method according to claim 1 when executing the computer programs stored on the memory.

18. The electronic device according to claim 17, wherein the processor is further configured to implement operations comprising:

in response to the packet being successfully matched with a second flow entry in the flow table, determining that the virtual IP address drifts into a virtual machine in the second cluster, deleting the static routing corresponding to the virtual IP address on the router of the second cluster, and adding the static routing corresponding to the virtual IP address to a router of the first cluster according to the virtual IP address and the MAC address corresponding to the virtual IP address.

19. The method according to claim 1, wherein the router is configured with a static routing table, and the static routing table is configured to store the static routing corresponding to the virtual IP address.

20. A computer non-transitory readable storage medium having instructions stored thereon, wherein the instructions, when executed by one or more processors, cause the processors to perform the method according to claim 1.

* * * * *